Oct. 30, 1962     E. P. ESCHER     3,060,665
VARIABLE PITCH HARVESTER COMBINE AUGER
Filed March 21, 1960     2 Sheets-Sheet 1
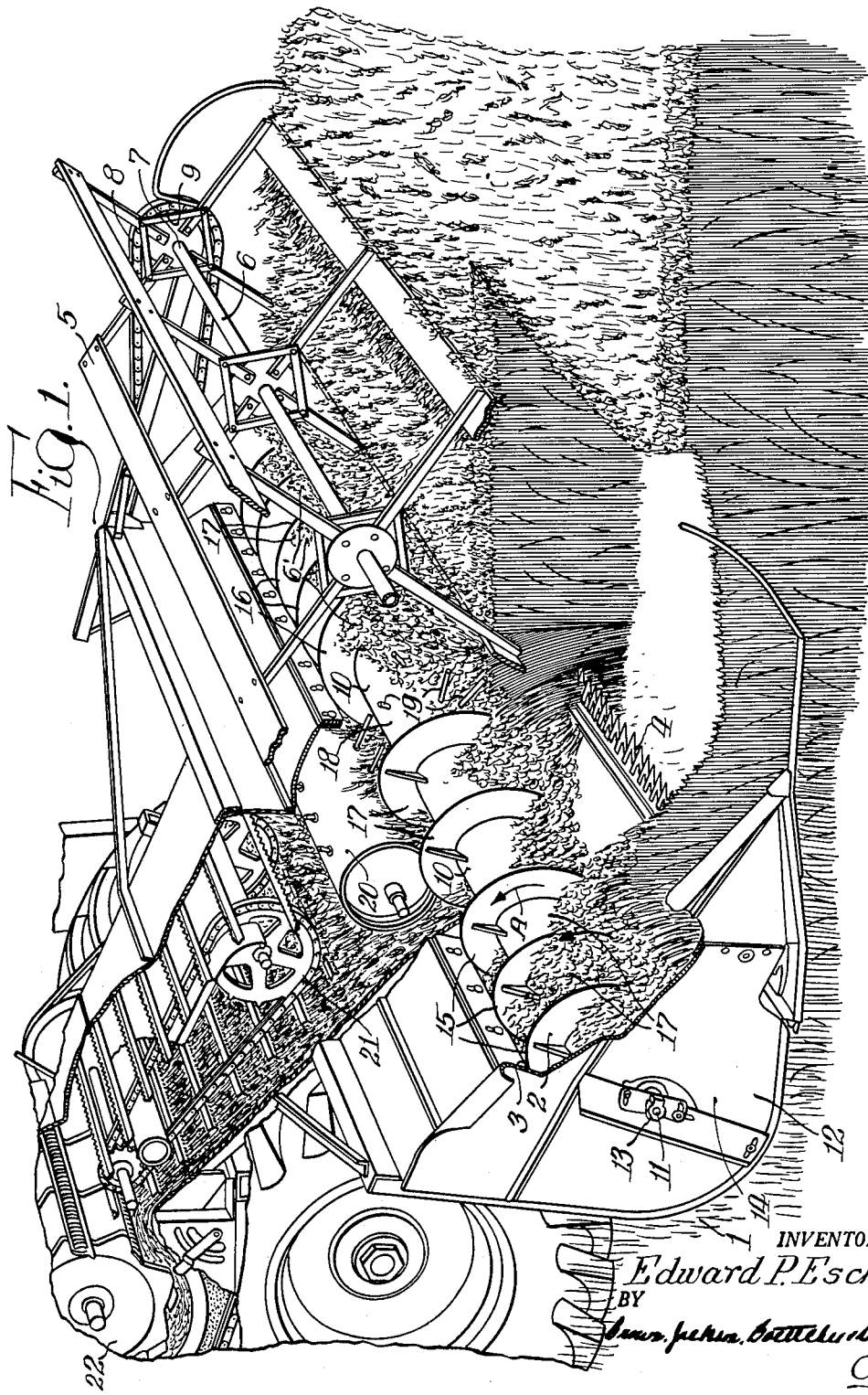
INVENTOR.
Edward P. Escher
BY
Atty's.

Oct. 30, 1962 E. P. ESCHER 3,060,665
VARIABLE PITCH HARVESTER COMBINE AUGER
Filed March 21, 1960 2 Sheets-Sheet 2
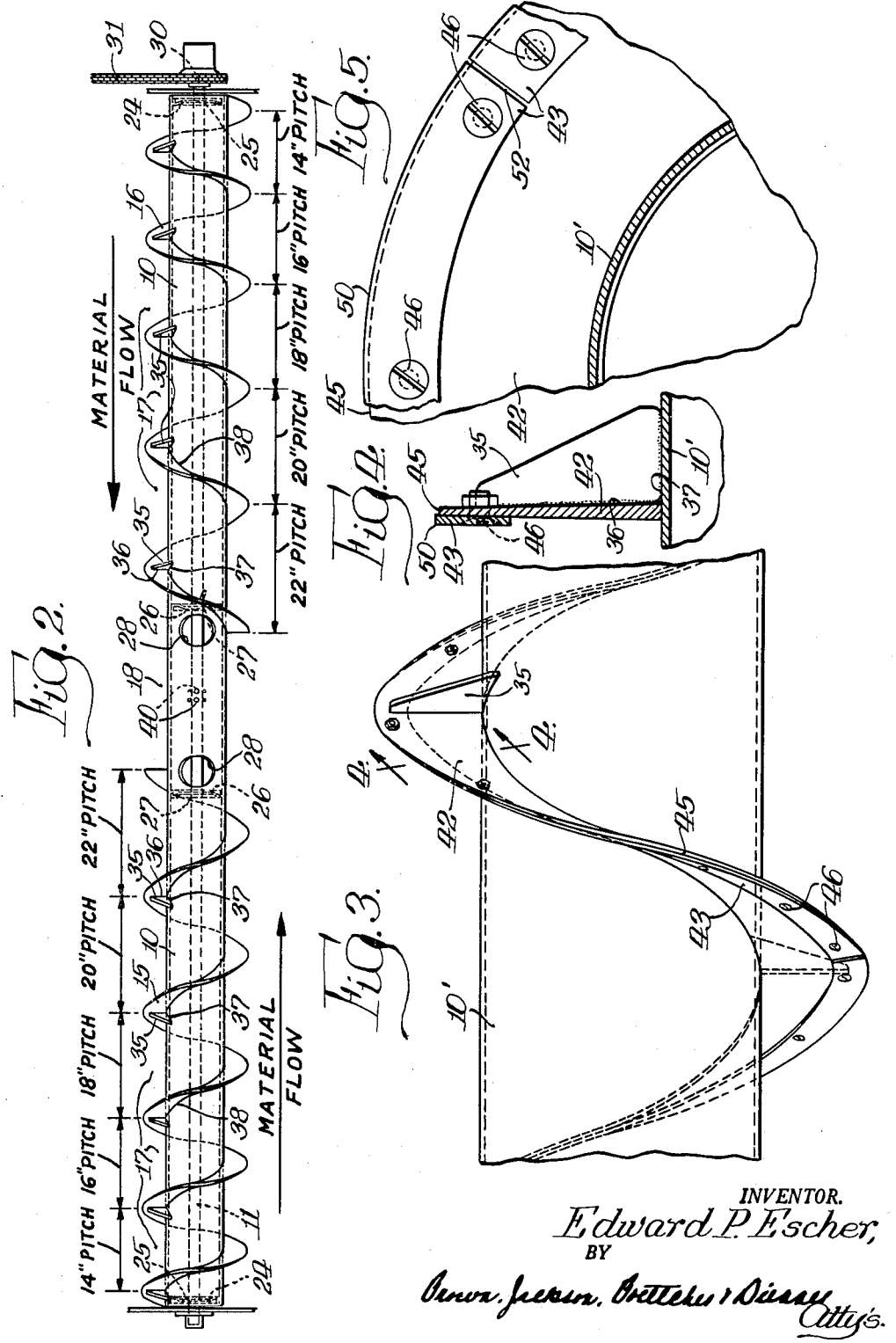
INVENTOR.
Edward P. Escher,
BY

United States Patent Office 3,060,665
Patented Oct. 30, 1962

3,060,665
VARIABLE PITCH HARVESTER COMBINE AUGER
Edward P. Escher, Flossmoor, Ill., assignor to Screw Conveyor Corporation, Hammond, Ind., a corporation of Illinois
Filed Mar. 21, 1960, Ser. No. 16,335
6 Claims. (Cl. 56—21)

This invention relates to a new and improved platform auger structure for harvester combines, i.e., harvesting machines having threshing mechanisms in conjunction therewith.

One illustrative form of harvester combine has, for example, a cutter bar from which the cut grain passes to a platform auger. The auger flighting carries the grain to the center of the auger or the center of the auger platform where retracting fingers take the material and feed it to a feeder beater. The feeder beater moves the grain to a feeder conveyor, which carries it to the threshing mechanism.

With prior auger structures of this character, the flighting has been of uniform pitch, i.e., the amount of advance of all portions of the flighting in the direction of the axis of the auger has been uniform, or of the same extent for each turn of the auger. Since the cut grain passes from the cutter bar to position on the auger platform and between the turns of the flighting, where, as in prior structures, the spacing between the turns of the flighting is as great at the outer ends of the auger as at the center portion or the portion to which the grain is carried by the auger, excessive grain is advanced in the direction of feed and, as a result, overloading and bunching of the grain occurs in its movement to the position from where it is carried to the threshing mechanism. This overloading is objectionable and even results in crowding out or displacing some of the grain from the auger platform and loss thereof.

The broad concept of the present invention resides in the provision of a variable pitch platform auger structure with the pitch length increasing along the auger platform to the position to which the grain is carried by the auger and from which it is delivered to the threshing mechanism.

The foregoing concept is highly advantageous in apparatus of this character. The pitch length determines the amount of grain that is advanced by the auger. Therefore, since the pitch length is less at the position from which the grain is advanced to the location from where it is delivered to the threshing mechanism, the feed will be more gradual toward the latter position, and overloading and bunching of the grain in movement to said latter position are avoided. As a result, crowding out, or displacement, and loss of grain from the auger platform is eliminated, or at least substantially reduced.

The larger the combine, the more valuable is the variable pitch platform auger, according to the present invention.

Another object is the provision of a variable pitch platform auger in which the patch of the flighting increases uniformly along the auger platform to the position to which the grain is carried by the auger and from which it is delivered to the threshing mechanism.

Another object is the provision of a variable pitch platform auger in which the pitch of the flighting increases from opposite ends to the center of the auger, from where the grain is delivered to the threshing mechanism.

Another object is the provision of a variable pitch platform auger of the character set forth with wearing strips detachably secured along and projecting from the outer edges of the flighting, so that wear will be confined to the outer edges of the wearing strips which, when worn, may be conveniently replaced, for example, in the field, without discarding the entire auger, as has been necessary where metalized flighting has been employed.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a perspective view showing a portion of one illustrative form of harvester combine employing a variable pitch platform auger embodying the present invention;

FIGURE 2 is a longitudinal elevational view of the variable pitch auger shown in FIGURE 1;

FIGURE 3 is a fragmentary longitudinal view of an auger according to FIGURES 1 and 2, having wearing strips detachably secured along and projecting from the outer edges of the variable pitch flighting;

FIGURE 4 is a fragmentary sectional view taken along the line 4—4 of FIGURE 3; and FIGURE 5 is a fragmentary side view of a portion of the flight illustrated in FIGURES 3 and 4 and showing the manner in which the wearing strips are applied to the outer edge of the flight.

Referring now to the drawings, the portion of the harvester combine selected for illustration comprises a platform 1 at the front of the machine having an auger 2 provided with flighting 3 for receiving grain between the turns of the flighting 3 from the cutter bar 4.

The reel 5 folds the grain 6' to the cutter bar 4 until cut. The reel shaft 6 is journaled at opposite ends in bearings on the machine, one of these bearings being illustrated at 7 in FIGURE 1. A chain shown more or less diagrammatically at 8 in FIGURE 1 is trained about a drive sprocket 9 on the shaft 6, and drives or rotates the reel 5 from the drive mechanism of the combine, as well understood in the art.

The auger 2 comprises a tube 10 formed of steel or other suitable material, and having the flighting 3 disposed helically about the outer surface thereof. A shaft 11 extends axially through the tube 10, and is journaled for rotation at opposite ends in bearings carried by the end walls of the pan structure 12 of the platform 1. One such bearing 13 is illustrated as carried by one end wall 14.

In the illustrated embodiment of the invention, the flighting 3 comprises a helical flight 15 at one end of the tube 10, and a reversely helical flight 16 at the opposite end of the tube. The auger rotates in the direction of the arrow A in FIGURE 1. The cut grain is received in the spaces 17 between the turns of the flights 15 and 16 from the cutter bar 4. The flights 15 and 16 rotate as parts of the auger; the flight 15 carrying the grain from the lefthand end of the auger, as illustrated in FIGURE 1, to the central portion 18 of the auger. At the same time the reversely helical flight 16 carries the grain from the righthand end of the auger to the central portion 18.

The auger tube 10 has retracting fingers 19 which take the material at the central portion 18 of the auger and feed the same to a feeder beater 20. The feeder beater 20 moves the grain to a feeder conveyor 21 which carries the grain, for example, to a rasp-bar cylinder 22 for threshing.

The further passage of the grain through the machine may be in any known manner, and since these aspects and the results thereof form no part of the present invention, they have not been illustrated and will not be described herein.

Fixed, for example, by welding or otherwise within opposite ends of the tube 10 are discs 24. These discs 24 have axial openings 25 through which the shaft 11 extends, and are fixed on the shaft for rotation of the auger therewith. A second pair of discs 26 are similarly fixed within the tube 10 at opposite ends of the central portion 18. These discs 26 also have axial openings 27 through which the shaft 11 extends, and are similarly fixed on the shaft for rotation therewith.

Between the discs 26 the wall of the tube 10 has hand holes 28 opening therethrough for access to the retracting fingers 19, as well understood in the art.

For the purpose of rotating the auger 2, the shaft 11 to which the tube 10 is attached is shown more or less diagrammatically in FIGURE 2 as having a sprocket 30 fixed on one end of the shaft. A chain also shown more or less diagrammatically at 31 in FIGURE 2 is trained about the sprocket 30 and drives or rotates the auger 2 from the drive mechanism of the combine.

Each flighting 15 and 16 is of variable pitch, the flighting 15 increasing in pitch from the lefthand end of the auger as illustrated in FIGURE 1 to the central portion 18, and the flighting 16 increases in pitch from the righthand end of the auger 2 to the central portion 18.

In the embodiment of the auger flighting illustrated in FIGURE 2, the outer end turns of the flighting 15 and 16 each has a pitch of 14" to the next turn. The next turns inwardly toward the central portion 18 each has a pitch of 16" to the next turns. The next turns each have a pitch of 18" to the succeeding turns, and the two succeeding turns have pitches of 20" and 22" respectively, all as indicated in FIGURE 2.

The pitch variation of the flights 15 and 16, as illustrated in FIGURE 2, provides flighting the pitch length of which increases gradually and uniformly from opposite ends to the center of the auger 2. It is understood, however, that only one, or any desired number of pitch length variations between the outer end of the auger, or the place where the grain is received, and the center portion 18, or the position from where the grain is delivered to the threshing machine, are contemplated within the scope of the broader aspects of the present invention.

As previously indicated, the pitch length of the flighting per turn determines the amount of grain that is advanced by the auger. Therefore, since the pitch length is less at position from whence the grain is advanced by the auger to where it is delivered to the threshing machine, the feed will be more gradual to the latter position, and objectionable overloading and bunching of the grain in movement to the latter position are avoided. In other words, the grain is cleared away from the front of the combine in regular, even flow. Crowding out or displacement and loss of grain from the auger platform is eliminated, or at least substantially reduced. The variable pitch platform auger structure, according to the present invention, better handles long lengths of grain, straw, etc.

In forming the auger, strips of steel or other suitable material are rolled to the desired helical forms of the flights 15 and 16. Generally triangular lugs 35 are attached to the flights 15 and 16, as by welding at 36. The helical flights 15 and 16 are then telescoped or passed slidingly into place over the outer surface of the tube 10, and the lugs 35 are attached to the tube as by welding at 37. The inner edges 38 of the flights 15 and 16 are also preferably welded to the tube 10 at spaced intervals. In one illustrative embodiment of the invention the auger, including the tube 10 and flights 15 and 16, is turned or rotated about 350 r.p.m., but this may, of course, vary widely within the scope of the present invention.

Holes 40 are shown through the wall of the central portion of the auger tube 10 for the retracting fingers 19 which are operated by cams as well understood in the art. The holes 40 may be provided with suitable grommets.

In FIGURES 3, 4 and 5 the flight shown fragmentarily at 42 is similar to the flights previously described. In this form of the invention, wearing strips 43 are detachably secured along and project from the outer helical edge 45 of the flight. These strips 43 are rolled or formed to the shape of the flight 42 and may be of case-hardened steel or other suitable material. The strips 43 are applied to the handling or conveying sides of the flight 42, i.e., to the sides which advance the grain to the position from where it is delivered to the threshing mechanism. The strips 43 are secured around the turns of the flight 42, for example by case-hardened machine screws or bolts 46. The screws or bolts 46 are preferably countersunk in the auger flight and in the strips 43, as shown in FIGURE 4.

While the outer edges 50 of the strips 43 are shown projecting outwardly from the outer edge 45 of the flight 42, it is to be understood that these edges may be flush or aligned, if desired. In one illustrative form of the invention, thirty-two wearing strips are employed, end to end with slight clearance at 52 between the ends if desired. This, of course, may vary widely within the scope of the present invention.

In use, the wear is confined to the wearing strips 43 which, when worn, may be conveniently replaced, for example, in the field without discarding the entire auger as has been necessary where metalized flighting has been employed. Where metalized flights have been employed, and the metalizing wears off, it has heretofore been the practice to discard the auger rather than incur the expense of returning the same to a place where the flights may be remetalized. With the detachable wearing strips, when the strips become worn they may be conveniently removed and replaced by other strips by a service man or by the farmer himself.

The embodiments of the invention disclosed in the drawings and the specification are for illustrative purposes only, and it is to be expressly understood that said drawings and the specification are not to be construed as a definition of the limits or scope of the invention, reference being had to the appended claims for that purpose.

I claim:

1. In conveyor structure for harvesters, a rotatable auger conveyor comprising a pair of helical auger flights of opposite pitch for feeding material generally axially inwardly from the outer ends of said flights, said flights having their inner ends terminating in axially spaced relation to provide a central portion from which the material is fed laterally from said conveyor, the pitch of each of said flights increasing inwardly from the outer ends of said flights to their spaced inner ends to reduce crowding out of the material from between said flights in axial movement of the material by said flights inwardly to said central portion between said spaced inner ends of said flights.

2. A conveyor structure according to claim 1, wherein the opposite and inwardly increasing pitch of said flights increases uniformly from the outer ends of said flights to the inner spaced ends thereof.

3. A conveyor structure according to claim 1, wherein the rotatable auger conveyor has retracting fingers between the spaced inner ends of the flights for feeding the material laterally from said conveyor.

4. A conveyor structure according to claim 1, wherein hardened metallic wearing strips are detachably secured to the flights along the outer helical edges thereof.

5. A conveyor structure according to claim 1, wherein hardened metallic sectionalized wearing strips are detachably secured to the flights in generally end-to-end relation along the outer helical edges of said flights.

6. In a harvester combine, in combination, cutter means, a platform having a rotatable auger conveyor provided with flighting for receiving grain between the turns of said flighting from said cutter means, said flighting comprising a pair of helical auger flights of opposite pitch for feeding grain generally axially inwardly from the outer ends of said flights, said flights having their inner ends terminating in axially spaced relation to provide a central portion from which the grain is fed laterally from said conveyor, the pitch of each of said flights increasing inwardly from the outer ends of said flights to their spaced inner ends to reduce crowding out of grain from between said flights in axial movement of the grain by said flights inwardly to said central portion between said spaced inner ends of said flights, and means other than said flights between the spaced inner ends of the flights for feeding the grain laterally from said central portion of said conveyor.

References Cited in the file of this patent

UNITED STATES PATENTS

| | | |
|---|---|---|
| 2,397,305 | Wheat | Mar. 26, 1946 |
| 2,529,180 | Oehler | Nov. 7, 1950 |
| 2,682,948 | Millard et al. | July 6, 1954 |